United States Patent [19]
Henderson et al.

[11] Patent Number: 6,111,593
[45] Date of Patent: Aug. 29, 2000

[54] USING MULTIPLE DIGITALLY-PRODUCED EXPOSURE LEVELS TO COMPENSATE FOR LASER ABSORPTION IN READ IMAGE-ON-IMAGE XEROGRAPHY

[75] Inventors: Thomas A. Henderson, Rochester; Peter A. Crean, Penfield, both of N.Y.

[73] Assignee: Xerox Corporation, Stamford, Conn.

[21] Appl. No.: 08/786,611

[22] Filed: Jan. 21, 1997

[51] Int. Cl.[7] ............................................. B41J 2/385
[52] U.S. Cl. ........................... 347/115; 347/232; 347/251; 347/131; 347/900; 358/300; 399/181
[58] Field of Search .................................. 347/115, 116, 347/119, 232, 251, 131, 900, 254; 358/515, 518, 521, 523, 298, 453, 456, 296, 300; 399/177, 181, 301

[56] References Cited

U.S. PATENT DOCUMENTS

| | | |
|---|---|---|
| 4,275,413 | 6/1981 | Sakamoto et al. .................. 358/525 |
| 5,023,632 | 6/1991 | Yamamoto et al. ................. 347/119 |
| 5,157,483 | 10/1992 | Shoji et al. ...................... 358/540 |
| 5,252,995 | 10/1993 | Trask et al. ...................... 347/119 |
| 5,296,877 | 3/1994 | Sato .............................. 347/115 |
| 5,471,324 | 11/1995 | Rolleston ........................ 358/518 |
| 5,585,945 | 12/1996 | Ikeda et al. ..................... 358/515 |

*Primary Examiner*—N. Le
*Assistant Examiner*—Shih-Wen Hsieh
*Attorney, Agent, or Firm*—Kevin R. Kepner

[57] ABSTRACT

A method for achieving multiple exposure levels for IOI (IMAGE-ON-IMAGE) xerography when imaging a second color through a first toner layer previously developed on the photoreceptive member. In the example illustrated the data from the previous image paths (magenta and yellow) is analyzed. If the signal indicates that a magenta or yellow bit is present, the cyan output bit information passes to the ROS unchanged, or at full intensity. If however, the magenta and yellow are not present, a modified pattern providing an appropriate reduced exposure signal is sent to the ROS. The process of laser attenuation is blended with halftoning logic to avoid image degradation due to the attenuation.

15 Claims, 7 Drawing Sheets

USING MULTIPLE DIGITALLY-PRODUCED EXPOSURE LEVELS TO COMPENSATE FOR LASER ABSORPTION IN READ IMAGE-ON-IMAGE XEROGRAPHY

This invention relates generally to the image quality in a color image output terminal (IOT), and more particularly concerns a method for varying exposure in an image-on-image color printing machine to equalize development field differentials due to imaging through previous toner layers.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

The foregoing generally describes a typical black and white electrophotographic printing machine. With the advent of multicolor electrophotography, it is desirable to use an architecture which comprises a plurality of image forming stations. One example of the plural image forming station architecture utilizes an image-on-image (IOI) system in which the photoreceptive member is recharged, reimaged and developed for each color separation. This charging, imaging, developing and recharging, reimaging and developing, all followed by transfer to paper, is done in a single revolution of the photoreceptor in so-called single pass machines, while multipass architectures form each color separation with a single charge, image and develop, with separate transfer operations for each color. The single pass architecture offers a potential for high throughput.

Current practice in IOI xerography calls for high ROS exposures for the cyan separation to discharge the photoreceptor to an equal voltage under magenta and yellow toner and bare photoreceptor. If two exposure powers were available, one for bare photoreceptor and one for areas with previously developed toner, one is freed from the constraint of exposure to residual because the bare photoreceptor voltage could be independently controlled to be equal to the voltage over toner layers. This proposal submits evidence that such an approach is xerographically feasible and shows image quality benefits. To implement the multiple exposure technique, one must transfer information from the previous channels to control the exposure levels when printing the next separation. We propose an efficient method to apply signals from a previous halftone process to to effect a spatially modulated multiple level exposure for subsequent latent images.

The following disclosures may be relevant to various aspects of the present invention:

Portions of the foregoing disclosures may be briefly summarized as follows:

U.S. Pat. No. 5,296,877 describes a multicolor printing process in which the shape and intensity of an imaging beam are changed when imaging a portion of a photoconductive element upon which toner has been deposited.

U.S. Pat. No. 5,252,995 describes a system in which the boundaries are enhanced between different color areas by varying the laser power, U.S. Pat. No. 5,023,632 describes a method to vary the exposure between black and color toners by examining neighboring pixels around a target pixel.

In accordance with one aspect of the present invention, there is provided a method for controlling exposure in a full color image on image electrophotographic printing machine, comprising determining the presence of a first color toner from an image path signal, determining the presence of a second color toner from an image path signal and altering the image signal for a third color toner when the first color toner and the second color toner are present.

In accordance with another aspect of the invention there is provided a method for controlling exposure in a full color image on image electrophotographic printing machine, comprising determining the presence of a first color toner on a photoreceptive member from a first raster representation of the image at a resolution lower than t he raster, delaying the application of the information acquired from the first raster representation of the image, to be applied at the time of imaging of a second color and altering the exposure of the second color by selectively removing pixels from the image where no toner is previously deposited in the first image on the photoreceptive member.

Other features of the present invention will become apparent as the following description proceeds and upon reference to the drawings, in which.

This invention relates to an imaging system which is used to produce color output in a single revolution or pass of a photoreceptor belt. It will be understood, however, that it is not intended to limit the invention to the embodiment disclosed. On the contrary, it is intended to cover all alternatives, modifications and equivalents as may be included within the spirit and scope of the invention as defined by the appended claims, including a multiple pass color process system, and a single or multiple pass highlight color system.

Figure 1:
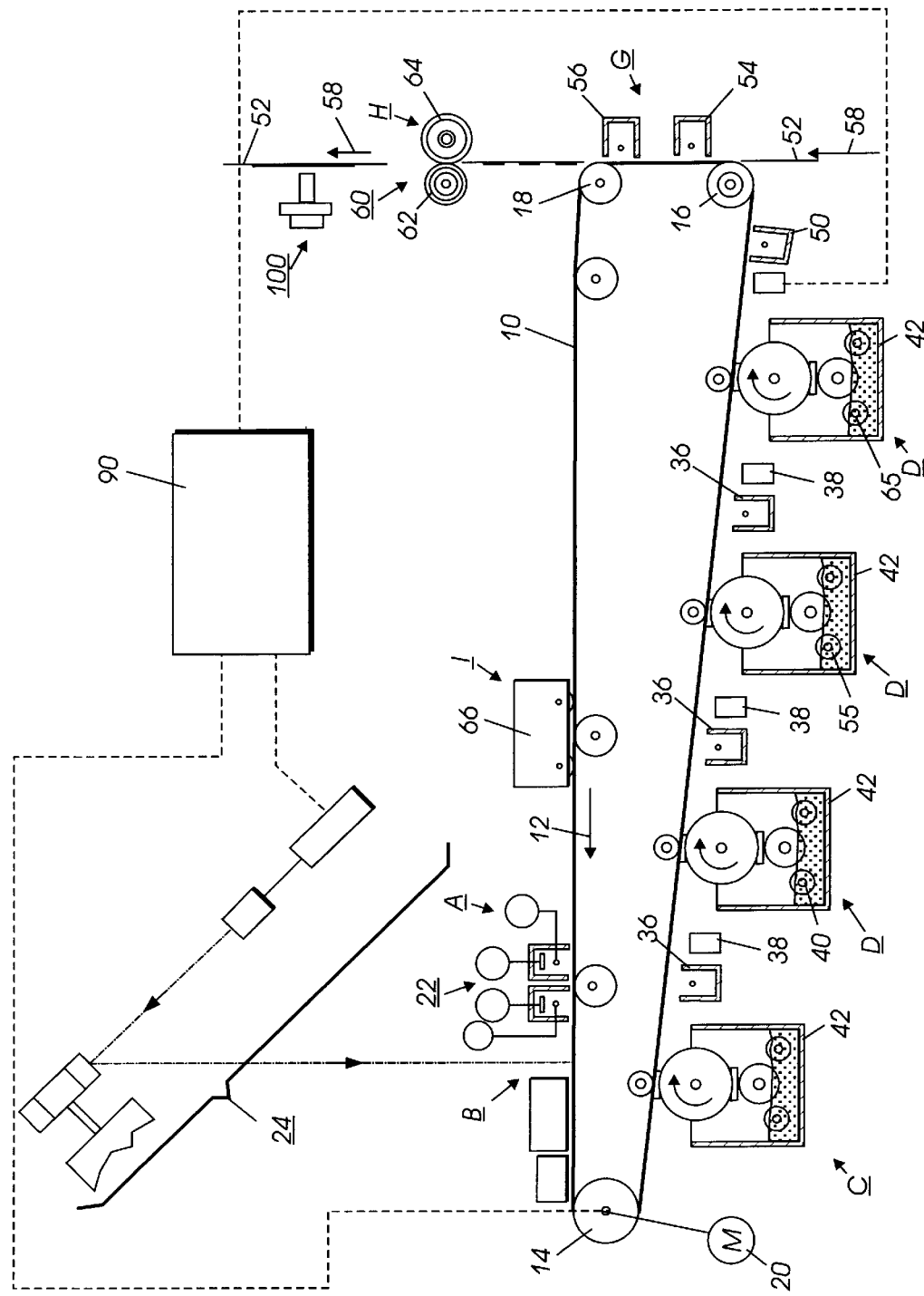
FIG. 1 is a schematic elevational view of a full color image-on-image single pass electrophotographic printing machine.

Turning now to FIG. 1, the printing machine of the present invention uses a charge retentive surface in the form of an Active Matrix (AMAT) photoreceptor belt 10 supported for movement in the direction indicated by arrow 12, for advancing sequentially through the various xerographic process stations. The belt is entrained about a drive roller 14, tension roller 16 and fixed roller 18 and the roller 14 is operatively connected to a drive motor 20 for effecting movement of the belt through the xerographic stations.

With continued reference to FIG. 1, a portion of belt 10 passes through charging station A where a corona generating device, indicated generally by the reference numeral 22, charges the photoconductive surface of belt 10 to a relatively high, substantially uniform, preferably negative potential.

Next, the charged portion of photoconductive surface is advanced through an imaging station B. At exposure station B, the uniformly charged belt 10 is exposed to a laser based output scanning device 24 which causes the charge retentive surface to be discharged in accordance with the output from the scanning device which receives print data signals from controller 90. Preferably the scanning device is a laser Raster Output Scanner (ROS). Alternatively, the ROS could be replaced by other xerographic exposure devices such as LED arrays.

The photoreceptor, which is initially charged to a voltage $V_O$, undergoes dark decay to a level $V_{ddp}$ equal to about −500 volts. When exposed at the exposure station B it is discharged to $V_{expose}$ equal to about −50 volts. Thus after exposure, the photoreceptor contains a monopolar voltage profile of high and low voltages, the former corresponding to charged areas and the latter corresponding to discharged or background areas.

At a first development station C, developer structure, indicated generally by the reference numeral 42 utilizing a hybrid jumping development (HJD) system, the development roll, better known as the donor roll, is powered by two development fields (potentials across an air gap). The first field is the ac jumping field which is used for toner cloud generation. The second field is the dc development field which is used to control the amount of developed toner mass on the photoreceptor. The toner cloud causes charged toner particles to be attracted to the electrostatic latent image. Appropriate developer biasing is accomplished via a power supply. This type of system is a noncontact type in which only toner particles are attracted to the latent image and there is no mechanical contact between the photoreceptor and a toner delivery device to disturb a previously developed, but unfixed, image.

A corona recharge device 36 having a high output current vs. control surface voltage (I/V) characteristic slope is employed for raising the voltage level of both the toned and untoned areas on the photoreceptor to a substantially uniform level. The recharging device 36 serves to recharge the photoreceptor to a predetermined level.

A second exposure or imaging device 38 which comprises a laser based output structure is utilized for selectively discharging the photoreceptor on toned areas and/or bare areas, pursuant to the image to be developed with the second color developer. At this point, the photoreceptor contains toned and untoned areas at relatively high voltage levels and toned and untoned areas at relatively low voltage levels. These low voltage areas represent image areas which are developed using discharged area development (DAD). To this end, a negatively charged, developer material 40 comprising color toner is employed. The toner, which by way of example may be yellow, is contained in a developer housing structure 42 disposed at a second developer station D and is presented to the latent images on the photoreceptor by way of a second HSD developer system. A power supply (not shown) serves to electrically bias the developer structure to a level effective to develop the discharged image areas with negatively charged yellow toner particles 40.

The above procedure is repeated for a third imager for a third suitable color toner such as magenta and for a fourth imager and suitable color toner such as cyan. The exposure control scheme described below may be utilized for these subsequent imaging steps. In this manner a full color composite toner image is developed on the photoreceptor belt.

To the extent to which some toner charge is totally neutralized, or the polarity reversed, thereby causing the composite image developed on the photoreceptor to consist of both positive and negative toner, a negative pre-transfer dicorotron member 50 is provided to condition the toner for effective transfer to a substrate using positive corona discharge.

Subsequent to image development a sheet of support material 52 is moved into contact with the toner images at transfer station G. The sheet of support material is advanced to transfer station G by conventional sheet feeding apparatus, not shown. Preferably, the sheet feeding apparatus includes a feed roll contacting the uppermost sheet of a stack copy sheets. The feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station G.

Transfer station G includes a transfer dicorotron 54 which sprays positive ions onto the backside of sheet 52. This attracts the negatively charged toner powder images from the belt 10 to sheet 52. A detack dicorotron 56 is provided for facilitating stripping of the sheets from the belt 10.

After transfer, the sheet continues to move, in the direction of arrow 58, onto a conveyor (not shown) which advances the sheet to fusing station H.

Fusing station H includes a fuser assembly, indicated generally by the reference numeral 60, which permanently affixes the transferred powder image to sheet 52. Preferably, fuser assembly 60 comprises a heated fuser roller 62 and a backup or pressure roller 64. Sheet 52 passes between fuser roller 62 and backup roller 64 with the toner powder image contacting fuser roller 62. In this manner, the toner powder images are permanently affixed to sheet 52 after it is allowed to cool. After fusing, a chute, not shown, guides the advancing sheets 52 to a catch tray, not shown, for subsequent removal from the printing machine by the operator.

After the sheet of support material is separated from photoconductive surface of belt 10, the residual toner particles carried by the non-image areas on the photoconductive surface are removed therefrom. These particles are removed at cleaning station H using a cleaning brush structure contained in a housing 66.

It is believed that the foregoing description is sufficient for the purposes of the present application to illustrate the general operation of a color printing machine.

For image quality reasons, current development systems run in "field mode". This means that plenty of toner is made available to the development process and that the amount of toner that is developed is proportional to the applied development field. In REaD (Recharge, Expose and Develop) Image-on-Image xerography, the four toner layers for a color image are accumulated on the photoreceptor and then transferred together to paper. Development of each color therefore, can occur over previously developed toners. One configuration prints black first, over which no other color is printed. In such a configuration, cyan is printed last, where it can encounter previously developed yellow, magenta, or both. The stress case is development of cyan over yellow and magenta, henceforth referred to as "red". In this case, the ROS must expose through the red layer to discharge underlying photoreceptor. Due to the attenuation of the beam power, a substantial difference in the discharge voltage under red and on the bare photoreceptor can exist. The developer roll bias is spatially constant so the variation in discharge causes a variation in the development field and therefore a difference in the amount of cyan toner that is developed over red compared to the bare photoreceptor.

A desired state is to develop cyan over red to produce a neutral process black. When the development field over red is raised to the point where this is possible, cyan in isolation will have a very large development field and show an excessive solid area density. One way to fix the discrepancy in development field is to expose the photoreceptor to residual in all cases. The ROS power is adjusted so that residual is just obtained under red, as shown in FIG. 2. The unattenuated power used for pure cyan is then far into residual, overexposing the latent image. This overexposure carries undesirable image quality characteristics; steep tone reproduction and line growth.

In an ideal case, the exposure power for cyan could simply be varied in accordance with the previously developed images to expose properly in all cases. This invention describes a practical method to approach the ideal case, and achieve at least some of the benefits of ideal multilevel exposure. The discussion at this point will reference a specific implementation, from which a more general scheme can be readily extracted.

In tests, the ROS exposes the photoreceptor on an 2400×600 spi raster. Incoming contone images are accepted at 600×600 spi. For each area 1/300 on a side then, there are 16 bits of information written by the ROS. The exposure strategy first looks at the halftoned cyan image to find any areas 1/300 square that are completely filled with cyan toner. If the corresponding magenta and yellow image is completely empty in the square, the cyan image will be altered within the square to reduce the exposure. In other words, if cyan alone is printed in an area at least as large as 1/300 square, it is printed with reduced exposure.

The test controller cannot modulate ROS power in an analog fashion, although such an implementation might be preferred. Instead, the power is reduced by turning off several of the bits of the 16 that print in the 1/300 square. One bit is equivalent to an area 1/2400"×1/600", so the information of that single bit is not resolved. When several of the bits are turned on in a dither pattern, several meaning 1, 2, 3 or possibly 4, the average exposure in the 1/300 square area is reduced.

Figure 2A:
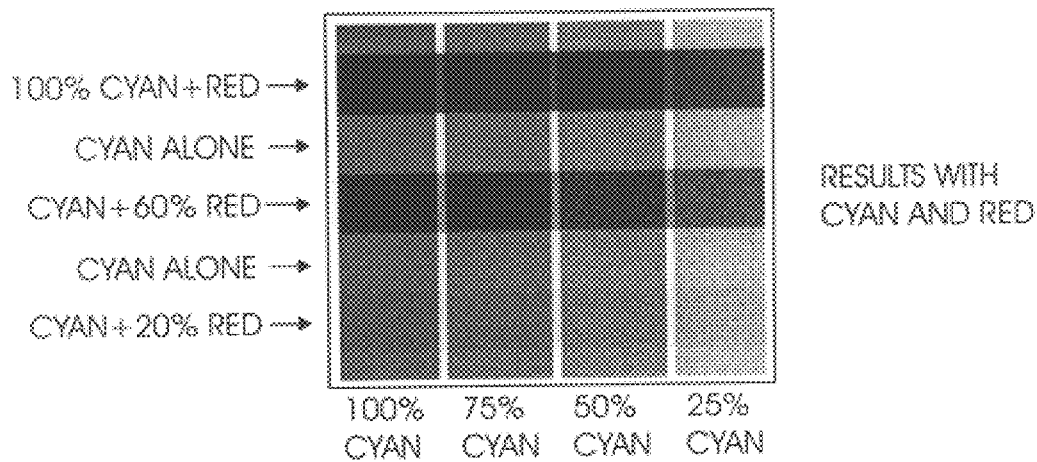
FIGS. 2A and 2B illustrate a graphical representation demonstrating the attenuation of the laser caused by previously developed toner layers.
Figure 2B:
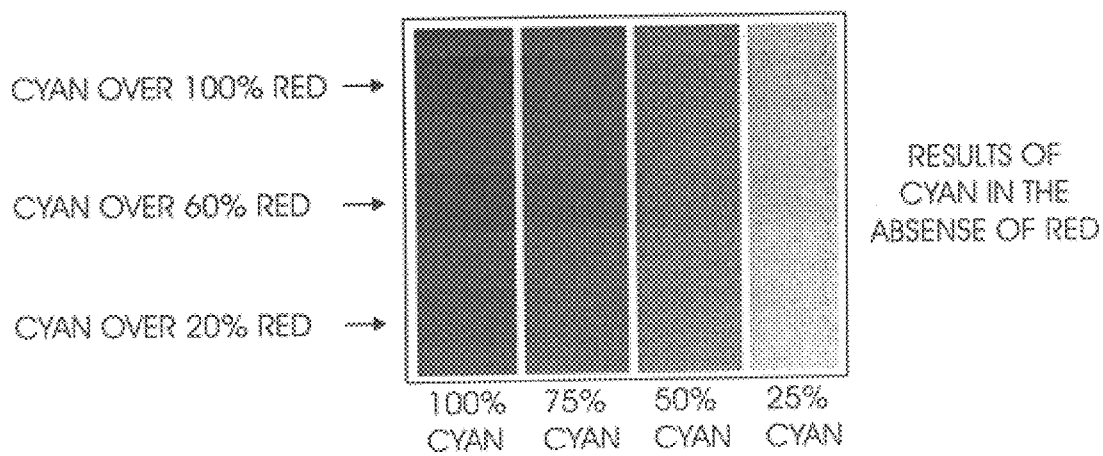

FIGS. 2A and 2B represent sample image areas where when red is present cyan is exposed at nominal power. Areas where cyan alone exists are printed at reduced power. The effect of the reduction is most easily seen on FIG. 2B, where the cyan separation alone appears. Areas where red would be present show the high density produced by nominal exposure, contrasting with the reduced exposure areas of cyan only. The implementation just discussed has some features that may be critical to the successful application of the idea. First, the variation in cyan exposure takes place at relatively low resolution, and only in areas that are completely filled with cyan toner. This feature may reduce or eliminate undesirable side effects that might result from misregistration, were the exposure variation to take place at higher resolution. Also, the exposure reduction simply reduces the development field at the interior of a halftone dot, not on the edges. The effect is to guide the "cyan only" tone reproduction curve to a lower solid area than would otherwise be the case. Edges are always printed at nominal exposure, thus avoiding possible unpleasant side effects from the cyan exposure reduction.

Figure 3A:
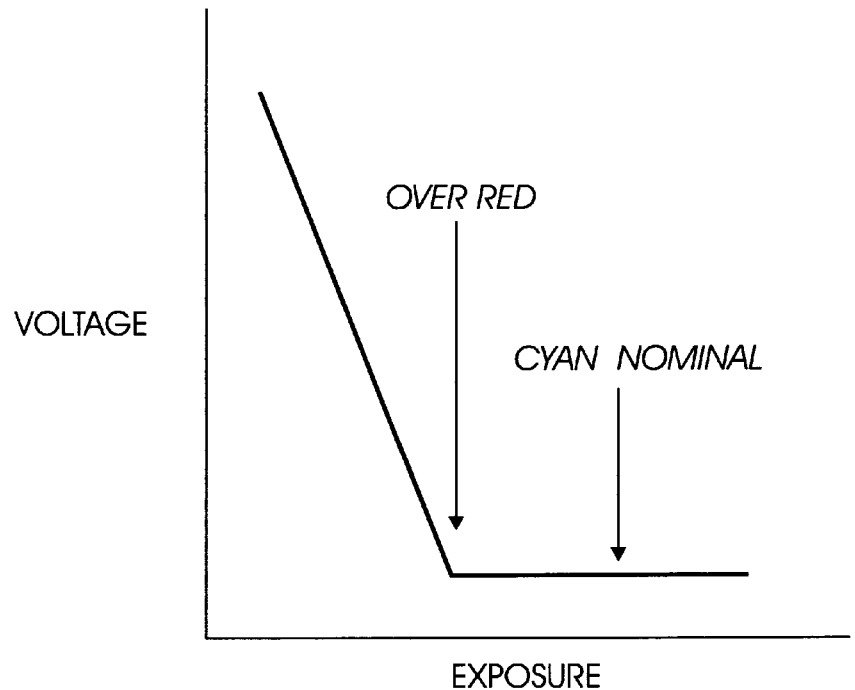
FIGS. 3A and 3B are a representation of the effect of the method disclosed herein on the development of a toner.
Figure 3B:
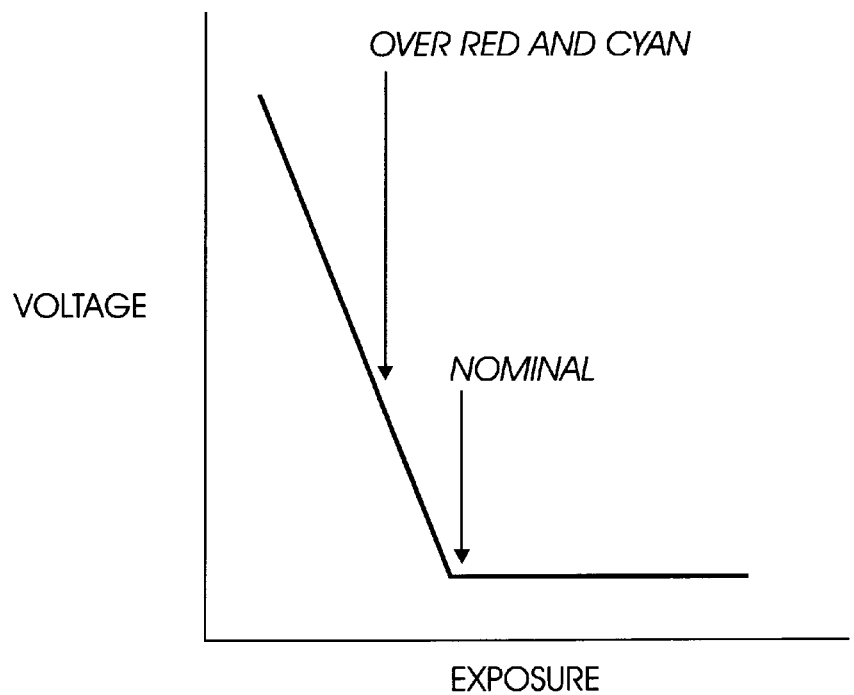

The benefits of two level cyan exposure are shown in FIG. 3. Since the "cyan only" exposure can be adjusted independently (at least to some extent), exposure to residual is no longer required to equalize discharge voltage. IOI setup can now set nominal exposure near residual for bare photoreceptor, and then adjust "cyan only" reduced exposure to discharge to the voltage above nominally exposed red. In essence, the technique allows an independent adjustment of cyan solid area density when neutral process black is obtained.

The discussion thus far has shown the xerographic benefits of two level exposure, but the cost is a mixing of image information between the color channels. In order to know when to change the cyan exposure, the location of magenta and yellow toner must be known. Now we propose a simple and efficient method to determine the cyan exposure signal from the magenta and yellow ROS bit stream. In this effort, we are aided by the relatively low resolution required for exposure modulation.

Figure 7:
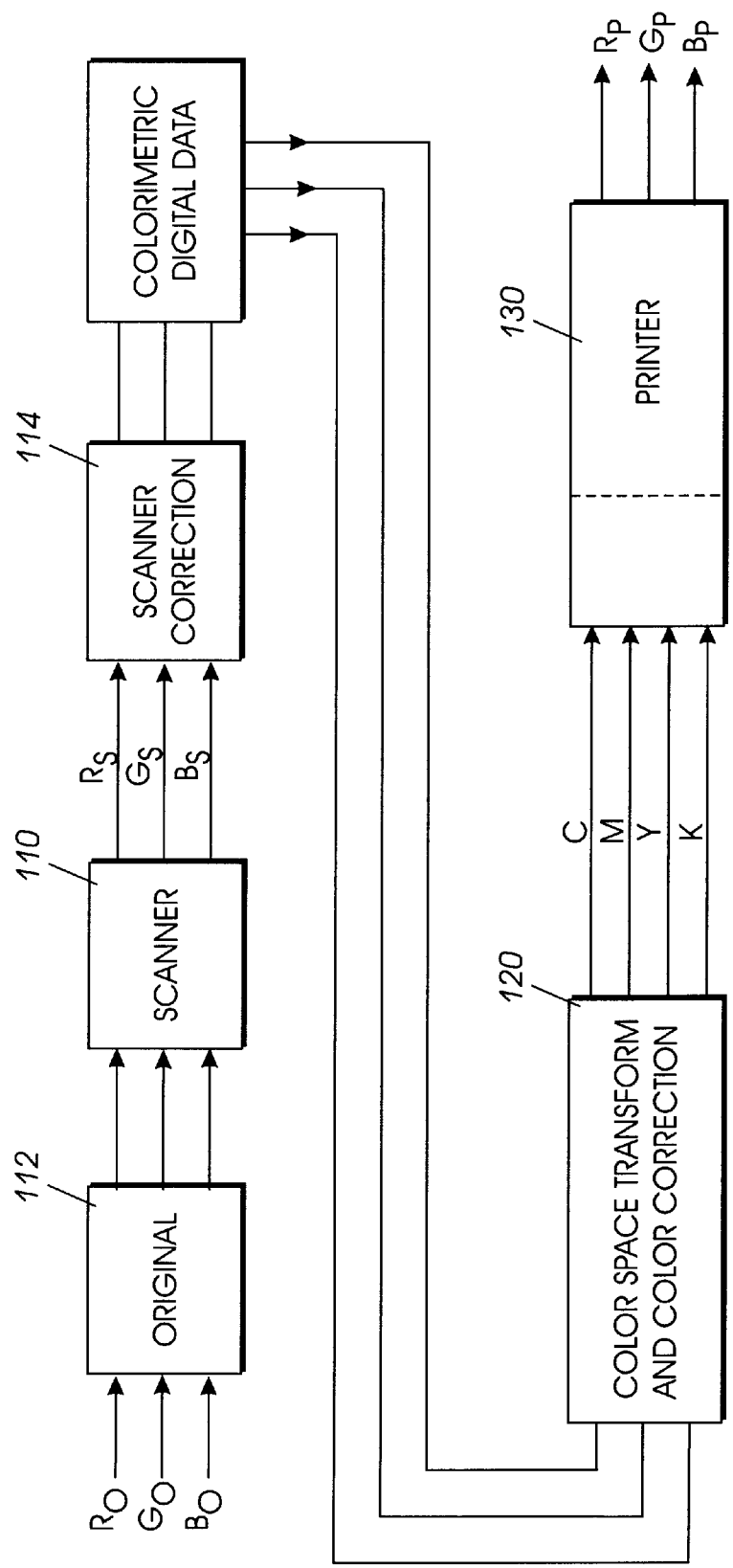
FIG. 7 is a flow diagram illustrating the color image path.

Referring now to FIG. 7, a basic color system such as that described in U.S. Pat. No. 5,471,324 to Rolleston, the relevant portions of which are hereby incorporated by reference, incorporating the present invention is shown. In a system, a scanner 110, which can be calibrated to produce a set of digital colorimetric or device independent data describing a scanned image 112, which, by definition can be defined in terms of the calorimetric $R_o$, $G_o$, $B_o$ space. Resulting from the scanning operation is a set of scanner image signals $R_s$, $G_s$, $B_s$, defined in device dependent scanner terms. Incorporated into the scanner or another processing path is a post-scanning processor 114, which provides correction of scanner image signals $R_s$, $G_s$, $B_s$, to calorimetric terms, $R_c$, $G_c$, $B_c$, typically digital in nature. The values may be in terms of CIE color space (r,g,b), or the L*a*b* luminance-chrominance space ($LC_1C_2$). A color space transform, indicated by block 120, such as that described in U.S. Pat. No. 4,275,413 to Sakamoto, is used to convert the device independent data to device dependent data. The output of color space transform 120 is the image defined in terms of a device dependent space, or colorant driving signal $C_p$, $M_p$, $Y_p$, $K_p$ that will be used to drive the printer as shown in FIG. 1. In one possible example, the colorant values represent the relative amounts of cyan, magenta, yellow, and black toners that are to be deposited over a given area in the electrophotographic printer. It is these values which are adjusted by the method of the present invention. The printed output image may be said to be defined in terms of $R_p$, $G_p$, $B_p$, which are hoped to have a relationship with $R_o$, $G_o$, $B_o$ such that the printed output image has a color that is calorimetrically similar to the original image, although that similarity is ultimately dependent upon the gamut of the printing device.

Figure 4:
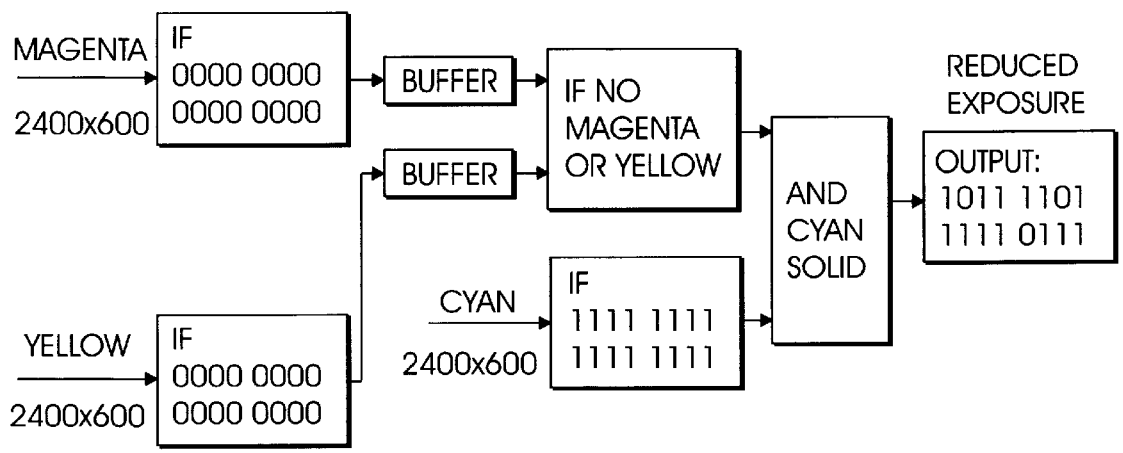
FIG. 4 illustrates an image path for an implementation of the method described herein.

Consider now an image path as in FIG. 4. Here contone image data arrives at 600 spi and the ROS writes at 2400 (perhaps up to 4800) spi in the fast scan direction and 600 spi in the slow scan direction. There are several implementations, but the diagram of FIG. 3 shows a simple embodiment. In FIG. 3, we consider an area 1/300" on a side. In this area, as in the test case, there are 16 bits of information. (A proposal for increased resolution poses no additional difficulty in the explanation to follow.) For the yellow and magenta channels, a single bit in each 1/300 square is derived from the image data of that square. Specifically, if all magenta and yellow bits are off, the output bit is set, otherwise it remains 0. This procedure would generate about 1 Mbit of data for each color in an 8.5×11 inch page.

The data from the magenta and yellow image path could be combined, or written into RAM storage, to be played out during the halftoning process for cyan. For each ⅟300 square, one bit from the magenta and one bit from the yellow channel is consumed. If both magenta and yellow bits are set, and all cyan output bits are set (indicating full cyan coverage), a pattern providing appropriate reduced exposure is sent in place of the 16 set bits. If the signal from the magenta and yellow channel indicates that magenta and yellow toner are present, the 16 bits of cyan information pass to the ROS unchanged. Thus, in its simplest form, cyan exposure can be modulated to two exposure levels with very modest amounts of memory.

The preceding discussions described the specific case. where the image was examined at moderate resolution (say 300 dpi) in the magenta and yellow image planes producing the signal to reduce the cyan exposure in areas where neither solid yellow or magenta existed to attenuate the laser exposure. The following passage expands the concept to include processing to yield an exposure correction chosen from several values.

The procedure outlined above can operate in an environment where all data is in binary form, simply instructing the ROS to turn on or off. For printers with more modest quality goals, this procedure is effective for improving the development of one toner over other toner layers. The following passage disclose additional enhancements to the idea, to avoid possible moire in tints and provide greater flexibility in the response to previously developed toner.

Figure 5:
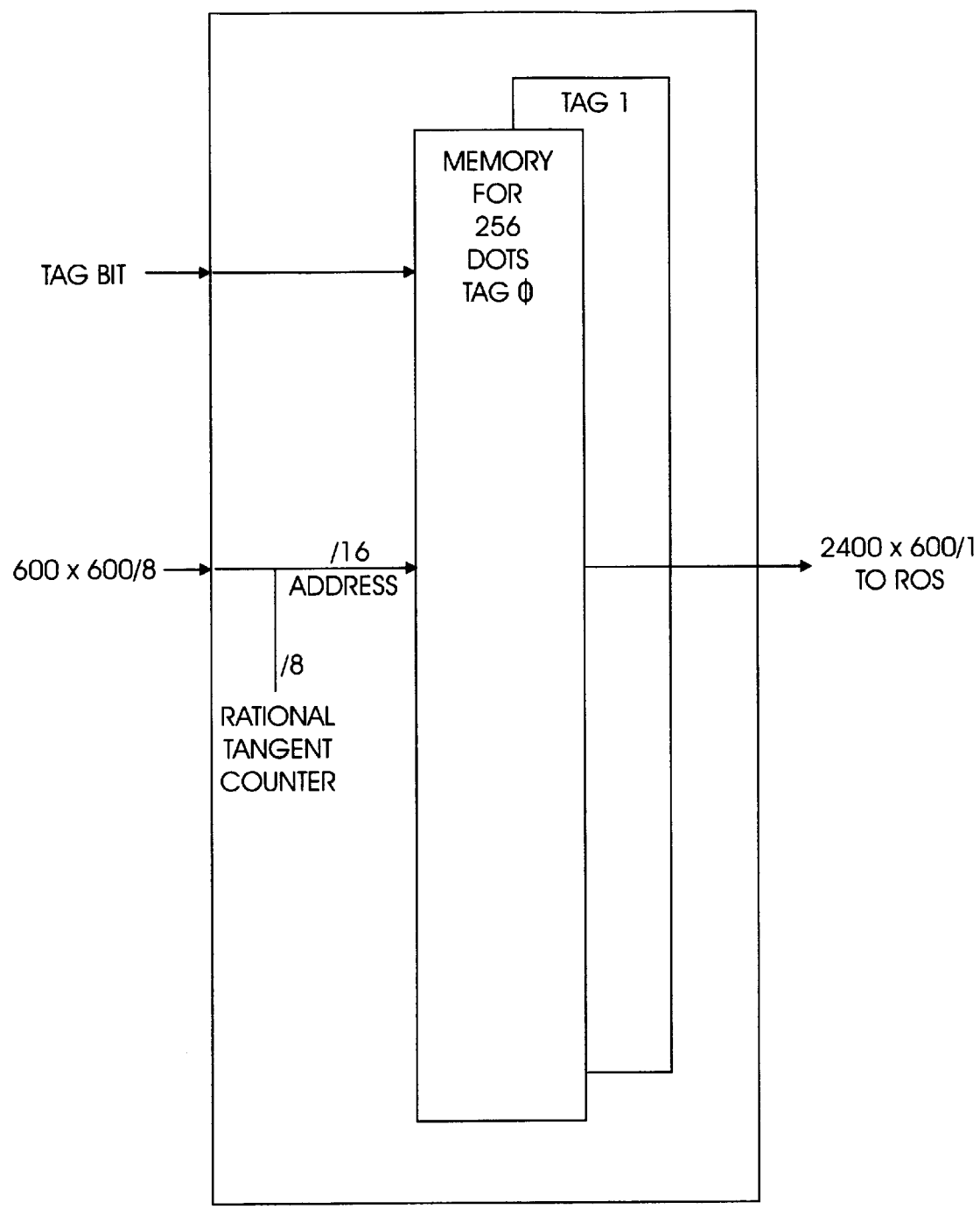
FIG. 5 is a block diagram of a rendering module for use with the method described herein.

FIG. 5 illustrates an example of a hardware halftoner in which a 600 ×600, 8 bit cyan signal is combined with the signal from a rational tangent halftone dot counter to achieve a 16 bit address. The address is used to fetch binary data to be sent to the ROS, which will ultimately form halftone dot structures to represent the value of the 8 bit input pixel. A tag bit, which in the case is illustrated as a 0 or a 1, directs which of two memory locations will generate the ROS signal for cyan. The function of the tag bit will be explained below.

Figure 8:
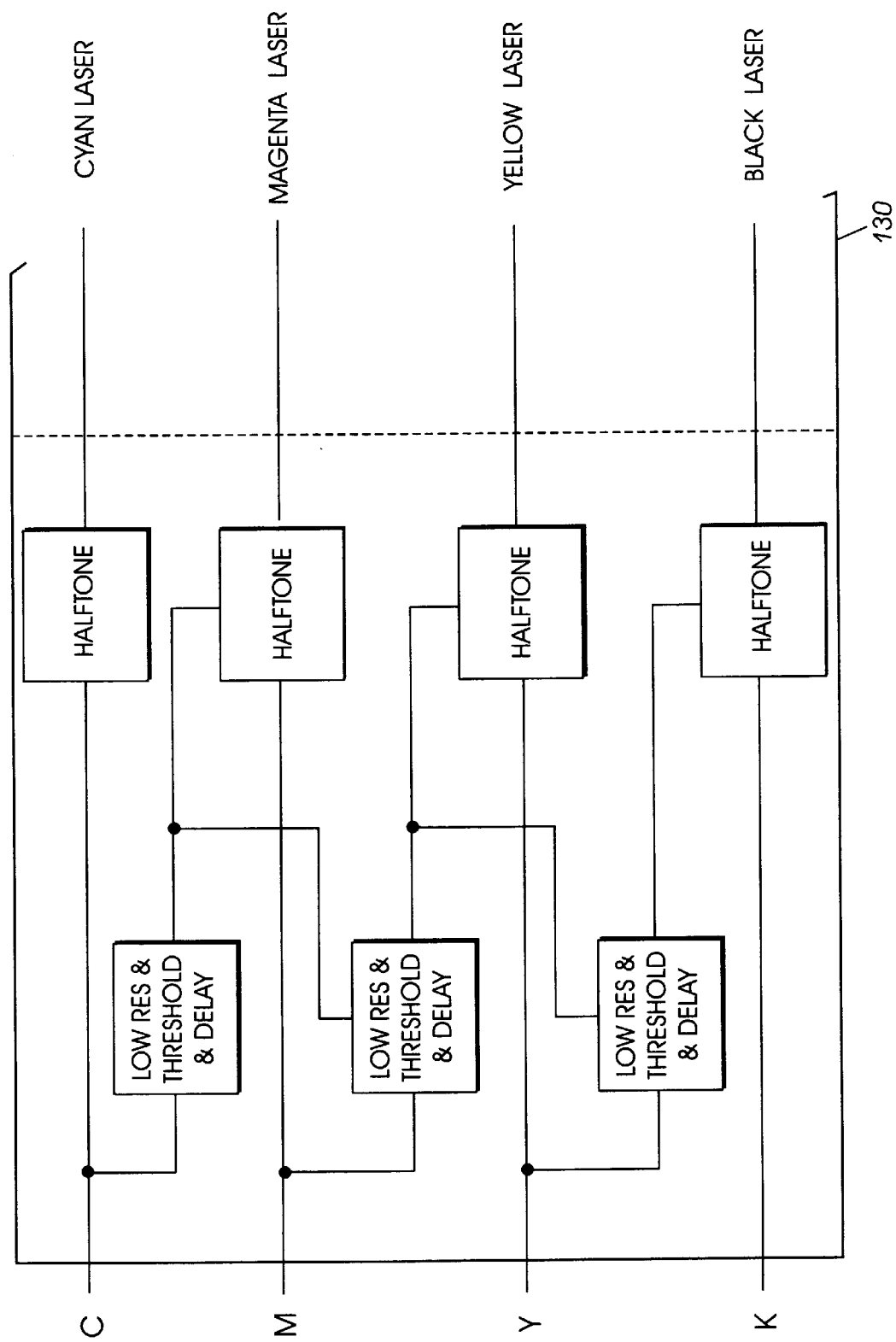
FIG. 8 is a diagram illustrating the logic flow for the variable color signals.

The input to the rendering module is a continuous tone raster (sampled at something like 600 spi). With the exception of fully saturated pixels, it is not possible to determine from this contone raster if a local region is covered by toner or not. After the halftone circuitry, a raster emerges that represents the toned and untoned regions. A sampling of this projected attenuation by developed toner at moderate resolution (300 spi) and higherquantization (say 2 bits/pixel) can be forwarded on to subsequent imaging stations to adjust the laser intensity when attempting to discharge this region. For example, if one bit is contributed by magenta and yellow, four levels of exposure for cyan can be specified to compensate for yellow only, magenta only, red or the absence previously developed toner. The use of a multibit/pixel attenuation control facilitates this more sophisticated processing. A logic flow for the Y chart of FIG. 8 is as follows:

The yellow continuous tone (darkness) signal enters the printer and is presented to the halftoner. The halftoner decides when to turn the laser on and off based on that signal and the position of the pixel within the halftone cell (standard Holladay methodology). Before sending that signal to the laser, it checks the delayed signal from M and C to see if there is toner already on that spot which will reduce the effect of the laser. If there is toner already there, the full signal is sent to the laser. If the no toner (or only a little toner)from the yellow and/or magenta imaging is present, the signal is modulated to reduce the exposure to approximately match the result from a full exposure through two toner layers.

In addition, the yellow signal is resolution. reduced and combined with the low resolution toner signal from the yellow/magenta stages, delayed, and passed on to the black halftoner for consideration.

Figure 6:
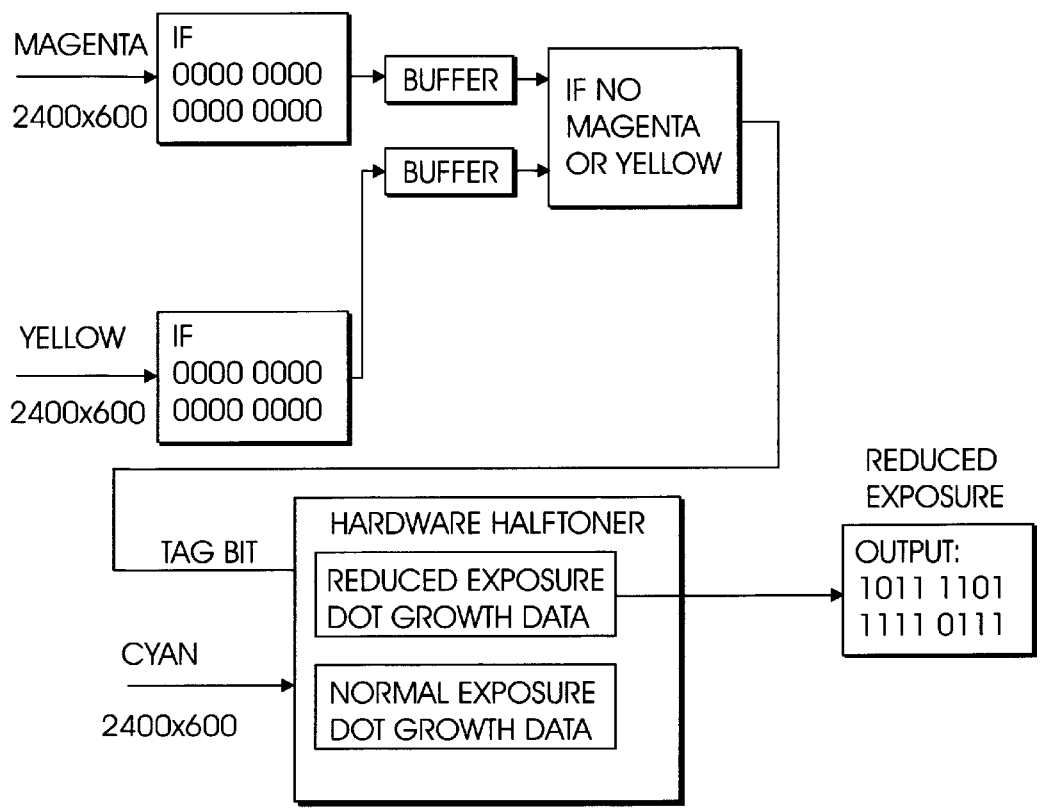
FIG. 6 is an image path diagram illustrating the use of the method herein in combination with the FIG. 5 rendering module.

A final concern is the interaction of the digital exposure correction with the halftoning. The pattern of selective removal of micropixels, even though they are not individually resolvable, can produce a moire in tinted areas by the elimination of pixels which are critical to the structure of certain halftone dot patterns. The concept shown in FIG. 6 uses the information from previous images to control the specific halftone dot growth. In this case, at least two separate halftone dot memories are required. One dot memory provides fully exposed dots. Another memory provides halftone dots where exposure at the center of the dot is reduced to accomodate exposure on a bare surface. The tag bit, as shown in FIG. 5, is created from previous imaging operations and selects one of two halftone growth strategies. In one case, the halftone dots contain only full exposure pixel, for the case of writing on top of previous toner.

In the other case, the interior of halftone dots contains reduced exposure pixels, for the case of writing on bare photoreceptor. In the case of multiple bit exposure control, multiple tag bits are present, and a separate halftone dot table is required for each state of the attenuation control. Since the exposure reduction is always in conformance with the halftone dot pattern, the possibility of a moire generated by the beating of the dot screen with the attenuation raster (300 spi) is eliminated. We thus assure that in solids, the exposure is reduced while at the same time being certain that each dot in a halftone screen is treated identically for the purpose of reducing the exposure.

Of course it will be readily apparent that the above scheme may be used for any color separation which is to be imaged through previously imaged and developed toner layers and the cyan described above is for illustrative purposes only.

In recapitulation, there is provided a method and apparatus for achieving multiple exposure levels for IOI xerography when imaging a second color through a first toner layer previously developed on the photoreceptive member. In the example illustrated the data from the previous image path (magenta and yellow) is analyzed. If the signal indicates that an area is completely covered by magenta and yellow, the cyan output bit information passes to the ROS unchanged, or at full intensity. If however, the magenta and yellow are not present, a modified pattern providing an appropriate reduced exposure signal is sent to the ROS. The process of laser attenuation can be blended with halftoning logic to avoid possible image degradation due to the attenuation of exposure.

It is, therefore, apparent that there has been provided in accordance with the present invention, an exposure control method and device that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for controlling exposure in a full color image on image electrophotographic printing machine, comprising:

determining the presence of a first color toner from an image path signal;

determining the presence of a second color toner from an image path signal;

altering the image signal for a third color toner when the first color toner and the second color toner are present.

2. A method according to claim 1, further comprising altering the image signal for the third color toner so that a halftoning image signal is not affected by the alteration.

3. A method according to claim 1 wherein said altering step comprises deselecting certain bits of said image signal of the altered color toner signal so that the third color toner image is not overexposed to create undesirable image quality characteristics.

4. A method for controlling exposure in a full color image on image electrophotographic printing machine, comprising:

determining the presence of a first color toner on a photoreceptive member from a first raster representation of the image at a resolution lower than the raster;

delaying the application of the information acquired from the first raster representation of the image, to be applied at the time of imaging of a second color;

altering the exposure of the second color by selectively removing pixels from the image where no toner is previously deposited in the first image on the photoreceptive member.

5. The method of claim 4 further comprising where information from a raster representation of the first color separation and a raster representation of the second color separation is applied to a third color imaging signal, to place a third image color separation in one of two exposure states depending on the simultaneous presence or absence of both color toners on the photoreceptive member.

6. The methods of claim 5 further comprising where the information from a raster representation of the first color separation and a raster representation of the second color separation is applied to a third color imaging signal, for forming a third image color separation so as to modulate exposure intensity by selecting one of several halftone dot memory banks.

7. The method of claim 5, further comprising where information is forwarded from a raster representation of the first color separation and a raster representation of the second color separation to a third separation at the full pixel resolution of the previous images.

8. The method of claim 4 further comprising where information from a raster representation of the first color separation and a raster representation of the second color separation is applied to a third color imaging signal, for forming a third image color separation to modulate the third color imaging signal, to one of four different levels for the presence of the first color, the second color, both the first color and the second color one, or neither, of the first color or the second color.

9. The methods of claim 8 further comprising where the information from a raster representation of the first color separation and a raster representation of the second color separation is applied to a third color imaging signal, for forming a third image color separation so as to modulate exposure intensity by selecting one of several halftone dot memory banks.

10. The method of claim 8, further comprising where information is forwarded from the raster representation of the first color separation and the raster representation of the second color separation to a third separation at the full pixel resolution of the previous images.

11. The methods of claim 4 where further comprising the information from a raster representation of the first color separation and a raster representation of the second color separation is applied to a third color imaging signal, for forming a third image color separation so as to modulate exposure intensity by selecting one of several halftone dot memory banks.

12. The method of claim 4, further comprising where information is forwarded from the raster representation of the first color separation and the raster representation of the second color separation to a third separation at the full pixel resolution of the previous images.

13. The method of claim 4, further comprising where information from the raster representation of the first color separation, the raster representation of the second color separation and the raster representation of the third color separation is applied to a forth imaging station for forming a fourth image color separation.

14. The method of claim 4 further comprising where information from a raster representation of the first color separation, a raster representation of the second color separation and a raster representation of the third color separation is applied to a fourth color imaging signal, for forming a fourth image color separation, to place the fourth imaging station in one of two exposure states depending on the simultaneous presence or absence of all the color toners on the photoreceptive member.

15. The methods of claim 4 further comprising where the information from a raster representation of the first color separation, a raster representation of the second color separation and a raster representation of the third color separation is applied to a fourth color imaging signal, for forming a fourth image color separation so as to modulate exposure intensity by selecting one of several halftone dot memory banks.

* * * * *